May 2, 1961  A. C. ELD ET AL  2,982,527
GAS-LIQUID CONTACT APPARATUS
Filed Dec. 31, 1956  3 Sheets-Sheet 1

INVENTORS
AKSEL C. ELD &
WILLIAM R. LEHRIAN
BY

THEIR ATTORNEY

May 2, 1961 A. C. ELD ET AL 2,982,527
GAS-LIQUID CONTACT APPARATUS
Filed Dec. 31, 1956 3 Sheets-Sheet 3

INVENTORS.
AKSEL C. ELD &
BY WILLIAM R. LEHRIAN

THEIR ATTORNEY

United States Patent Office 2,982,527
Patented May 2, 1961

2,982,527

GAS-LIQUID CONTACT APPARATUS

Aksel C. Eld, Pittsburgh, and William R. Lehrian, Verona, Pa., assignors to Gulf Oil Corporation, Pittsburgh, Pa., a corporation of Pennsylvania Filed Dec. 31, 1956, Ser. No. 631,648

5 Claims. (Cl. 261—114)

This invention relates to improvements in trays for vapor-liquid contacting towers and more particularly to an improved bubble cap structure for such trays.

Bubble tray towers have great importance in vapor-liquid contacting procedures such as fractional distillation of fluid mixtures, absorption of gases in liquids, and stripping of volatile components from liquids. The tower is used for bringing a stream of vapor and a stream of liquid into intimate counter-current contact.

Bubble tray towers are provided with a series of horizontal trays, usually equally spaced apart in the vertical tower. In the normal operation liquid flows downwardly from tray to tray and flows horizontally across each tray, a liquid level being maintained on each tray by overflow weirs. Vapor rises through openings or vapor passages in each tray and is intimately mixed with the liquid flowing across the tray. In the conventional bubble cap tray, a tubular chimney surrounds each opening or vapor passage and a stationary bell-shaped cap surmounts each chimney. The vapor rises from below the tray through the chimney, is diverted downwardly by the cap and bubbles out under the edges of the cap.

When the ratio of liquid to vapor is not excessive the conventional style bubble caps function reasonably well. However, in some operations they have serious disadvantages. For example, when the liquid flow greatly exceeds the vapor flow, as may occur in high pressure fractionation of hydrocarbon mixtures, there is a serious danger of "liquid dumping" which is the flow of liquid under the bubble caps and down the column through the vapor chimneys. When this occurs proper vapor-liquid contact is not obtained.

Bubble trays have been designed with the specific purpose of avoiding liquid dumping. One such tray employs a floating plate cap over each hole in the tray. The periphery of the cap rests on the tray floor and forms a liquid seal. This type of cap is simply a freely floating disk, loosely enclosed within an overhead framework that limits its upward movement. For any particular cap, when the vapor velocity is sufficiently high the cap is raised from the tray floor and vapor can bubble through the liquid on the tray. When the vapor velocity is low, the cap remains seated on the tray floor covering the hole in the tray and sealing against the flow of liquid downwardly through the vapor passage.

The floating plate cap type of bubble tray has to some extent reduced the problem of liquid dumping in fractionating towers. However, it has not been entirely successful in this respect and, furthermore, has other disadvantages. The floating plate cap permits large bubbles of vapor to escape through the liquid on the tray. As a result, intimate contact of all portions of the vapor and liquid is not obtained. In addition, when the cap rises from the tray floor, liquid can flow under one side of the cap while vapor is escaping from the other. In other words, liquid dumping can occur.

Our present invention resides in an improved bubble tray structure which avoids or reduces the problems of liquid dumping encountered with the conventional bell cap and chimney bubble trays, and the problems of poor liquid-vapor contact and liquid dumping that are encountered with the floating plate cap type of tray. In general, the bubble trays of our invention comprise a substantially horizontal tray having a plurality of openings which serve as vapor passages. Each of these openings is surrounded by a slotted chimney that projects upwardly from the upper surface of the tray. The chimney is surmounted by an upwardly movable or vertically displaceable bell-shaped cap, the lower periphery of which rests on the tray floor around the chimney when the vapor velocity is low, thus forming a seal against the flow of liquid into the chimney. The cap is provided with means for limiting its lateral and vertical movement. In the preferred form of the apparatus this means is a retaining spider which extends downwardly from the roof of the cap, through the chimney and the opening in the tray. The retaining spider has an enlarged portion spaced apart a short distance below the level of the tray which limits the upward movement of the cap.

We will describe our invention in more detail by referring to the drawings of which:

Figure 1:
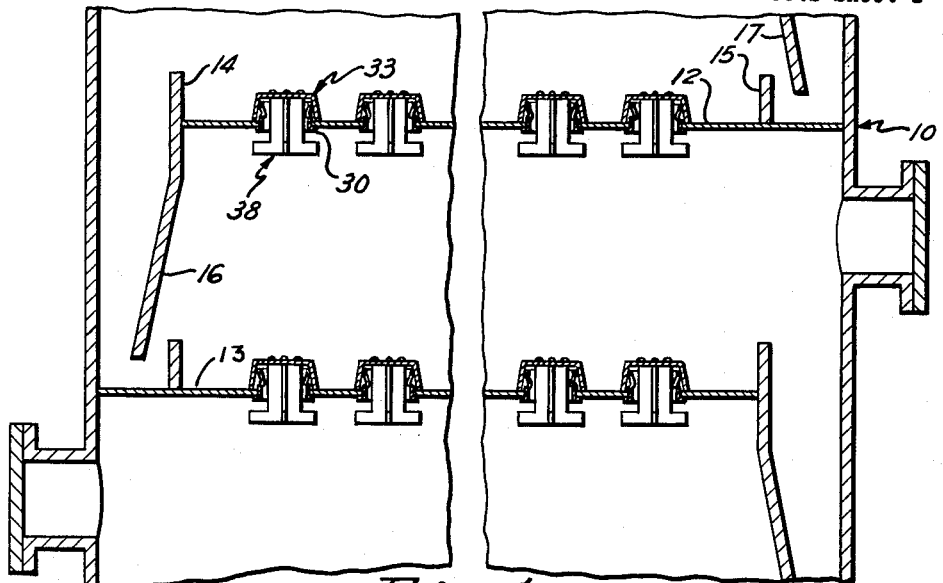
Figure 1 is a schematic sectional view of a portion of a fractionating column provided with trays of our invention.

In Figure 1 a portion of the fractionating tower 10 is shown in section. The vertical tower is provided with a series of horizontal trays such as tray 12 which are spaced apart substantially uniformly throughout the tower. Tray 12 is provided with an outlet weir 14 extending across one side of the tray and an inlet weir 15 extending across the other side, although an inlet weir is not in all cases essential for maintaining a liquid level on the tray. On the outlet side of the tray a downflow apron 16 extends below the tray and outlet weir 14. The apron 16 and the wall of column 10 form a passage for the flow or liquid to the tray below. Similarly, liquid flows from the tray above tray 12 through the passage formed by apron 17 and the wall of the fractionating column. This liquid flows over the weir 15, across tray 12 and over the weir 14. Thus, a level of flowing liquid is maintained across tray 12 above the bubble caps.

Figure 2:
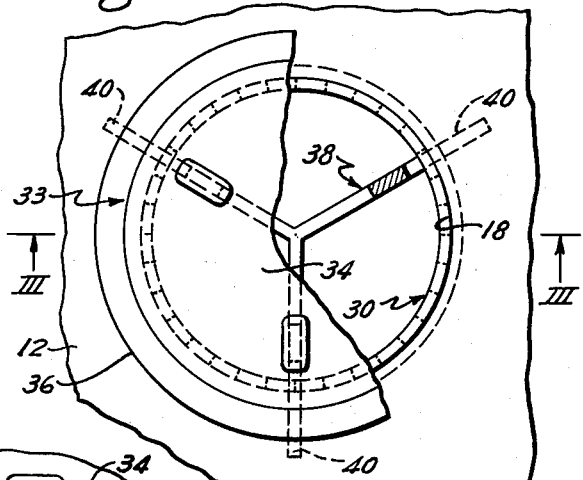
Figure 2 is a view in elevation, partly broken away, of one bubble cap assembly such as shown on the trays of Figure 1.

Tray 12 has openings or vapor passages 18 arranged in rows and each vapor passage is provided with a bubble cap assembly. The structure of these bubble cap assemblies is shown in detail in Figures 2 and 3. The assembly comprises an upstanding, generally tubular chimney such as the chimney 30 of Figure 3. The chimney is rigidly attached along its lower periphery to the rim of the hole 18 in tray floor 12. Chimney 30 is provided with a plurality of vertical slots 31 substantially equally spaced about its circumference.

Figure 3:
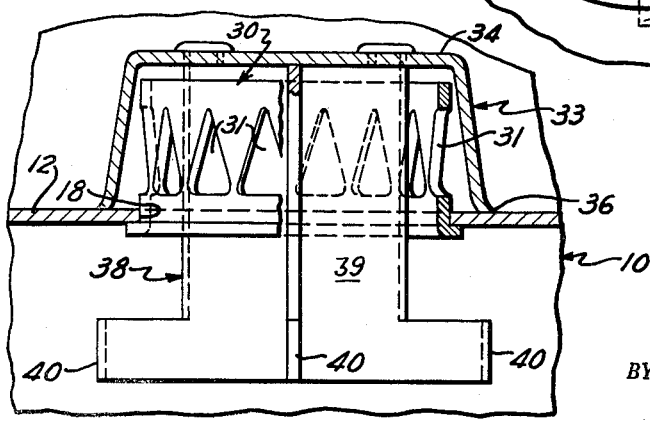
Figure 3 is a sectional view of the bubble cap assembly along line III—III of Figure 2.
Figure 4:
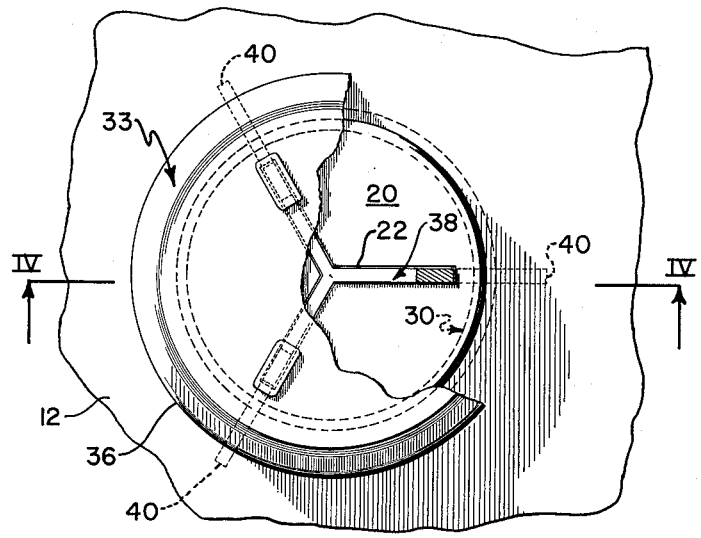
Figure 4 is a view in elevation, similar to Figure 2, partially broken away, of another aspect of the invention wherein the bubble cap assembly has the top of the chimney partially enclosed with a horizontal lid.
Figure 5:
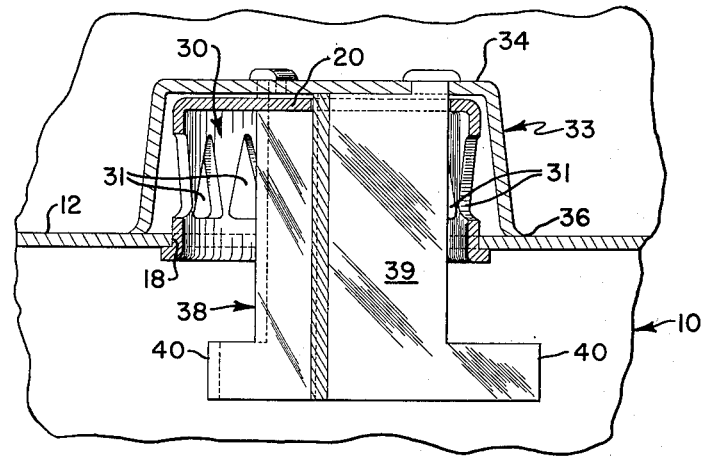
Figure 5 is a sectional view of the bubble cap assembly along line IV—IV of Figure 4.

Mounted over the chimney 30 is a bell-shaped cap 33. It has a top 34, which can be flat or dome shaped, and depending side walls. The lower periphery or rim 36 of the cap rests on the tray floor 12 when vapor is not flowing upwardly through the tray. As shown in Figure 3, the cap 33 at its smallest inside diameter is only slightly greater than the outside diameter of the chimney 30. The cap is just enough larger than the chimney to permit free vertical movement. Ordinarily, the inner surface of the side wall of the cap will be spaced apart no more than about 1/16 inch from the outer surface of the chimney at the smallest diameter of the cap. It is preferred that the cross sectional area of the annular space between the sides of the cap and the chimney be substantially smaller than the total slot area of the chimney so that a large part of the vapor rising through the chimney will escape through slots 31 instead of passing principally out of the open top of the chimney and down between the walls of the cap and chimney. If the annular space is sufficiently small most of the vapor will pass through the equally spaced chimney slots. Thus, the vapor flow will be uniformly distributed and small bubbles of vapor will pass under the rim of the cap. To insure passage of the vapor through the slots 31, the top of the chimney 30 can be at least partially enclosed with a horizontal lid 20, as shown in Figures 4 and 5. This lid 20 has openings 22 for the passage of the depending spider 38 therethrough.

A retaining spider 38 which serves as means for limiting the vertical and horizontal movement of cap 33 is attached under the top 34 of the cap and extends downwardly through the chimney 30. The spider can be attached to the cap in any suitable manner, for example, by welds or by peened lugs which pass through holes in the top of the cap, as shown in the drawings. At its lower end and spaced apart from the under side of tray 12 the spider 38 is provided with suitable enlarged portions, such as the lateral extensions 40 which extend beyond the circumference of chimney 30 and are thus too large to pass through the chimney or the hole 18 in the tray floor. The cap and retaining spider are free to move vertically a distance equal to the distance between the bottom of the tray floor and the extensions 40.

Figure 6:
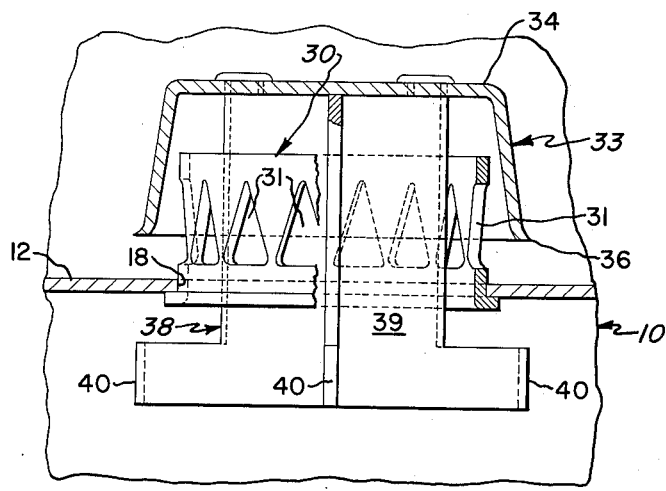
Figure 6 is a sectional view of the bubble cap assembly along line III—III of Figure 2, showing the bubble cap in a raised position.

We will describe the functioning of our bubble cap trays in fractional distillation of fluid mixtures by reference to one particular tray and bubble cap assembly shown in the drawings. As we have indicated, liquid flows downwardly from the tray above tray 12 and over the inlet weir 15. A liquid level is formed between the weirs 14 and 15. Liquid moves horizontally across tray 12, flowing over weir 14 and then down to the next lower tray 13. Vapors formed on tray 13 rise upwardly through the holes in tray 12. If the vapor velocity is sufficiently high, cap 33 is lifted from its position of rest on tray 12. This is shown, for example, in Figure 6 where the cap is in a raised position. The vapor passes through the slots in chimney 30, then under the periphery 36 of cap 33 and bubbles upwardly through the liquid which flows across tray 12. Since chimney 30 is provided with a number of slots the vapor flowing upwardly through the chimney is divided into small portions flowing through the different slots. As a result, the vapor passes under the rim of cap 33 in small bubbles in reasonably uniform distribution around the rim.

If the vapor velocity below tray 12 is not sufficient to force vapor upwardly through the vapor chimney 30, cap 33 remains seated on the floor of tray 12, as shown in Figure 3. The periphery or rim 36 resting flat against the tray floor forms a liquid seal and prevents liquid from flowing under the cap and into chimney 30. Consequently, liquid dumping does not occur. Our apparatus promotes intimate vapor-liquid contacting by the formation of small vapor bubbles that are distributed reasonably uniformly about each cap. Our use of a chimney with narrow vapor slots, promotes the formation of small bubbles of vapor. This is further favored by the fact that cap 33, when it rises, is kept substantially horizontal by the weight of the depending spider 38. The hanging spider serves as a means to stabilize the cap against tilting. Because of this hanging weight which gives the cap a low center of gravity, the cap cannot easily be tilted to release large bubbles of vapor or permit the leakage of liquid under the tilted rim of the cap.

Within the scope of the invention modifications can be made in the structure shown in the drawing. For example, although the drawing shows slots 31 of chimney 30 as being triangular with the apex pointing upwardly, good results can be obtained with slots of other shapes. For example, the chimney can have narrow rectangular slots or slots that are triangular with the apex pointing downwardly. In these cases the upper rim of the chimney can be serrated instead of unbroken as shown in the drawing. It is preferred that the chimney slots be narrow and evenly spaced apart so that uniform distribution of small bubbles will be obtained.

The shape of the cap and chimney can be varied. We have shown caps and chimneys of circular cross-section but they can also be of polygonal cross-section. For example, either the cap or the chimney or both can be of hexagonal or rectangular cross-section.

In the preferred embodiment of our apparatus we use a cap which, as shown by cap 33 in the drawing, has outwardly flaring side walls. That is to say, the diameter of cap 33 is greater at rim 36 than at the top of the cap. The advantage of this is that the annular space between the cap and chimney increases as the cap rises. Consequently, the cap, by rising only a short distance from the tray floor can greatly increase the space for vapor flow and can function at considerably higher vapor velocities while rising only a slightly greater distance from the tray floor than the distance required for low vapor velocity. While the flared structure of the cap is highly advantageous in combination with the other elements of our apparatus, advantages of our invention can be obtained with other cap structures. Thus, the cap can have vertical side walls or side walls which flare less than in the embodiment of the drawing.

The number of bubble cap assemblies on each tray can vary considerably. They should be arranged in rows perpendicular to the direction of flow of liquid across the tray and each tray should have at least two rows of caps. Ordinarily many more rows would be provided. For best results the rows of caps should be alternately staggered so that the liquid will not flow in channels between the rows where it may not be contacted by vapor.

Numerous variations in the structure of the retaining spiders can be made. The essential features are that they serve as means for limiting the vertical and horizontal movement of the caps and as means to prevent the caps from tilting when the caps are raised. The structure of spider 38 shown in the drawing is particularly well suited for providing stability for the cap 33 or, in other words, for preventing lateral movement and tilting of the cap. As the drawing shows, the spider 38 has three elongated, flat legs 39 which extend downwardly and radially. These legs serve as the connecting means between the cap and the extensions 40 which limit vertical movement of the cap. In addition, the legs extend radially almost to the inner circumference of the chimney and are equally spaced apart, and therefore serve as means for guiding the vertical movement and limiting horizontal displacement of the cap. The spider shown in the drawing has three such legs. This structure combines stability with low weight. However, the spider can have any reasonable number of legs.

As we have mentioned, the chimney 30 can be provided with a lid and the lid will have openings for the legs of the spider. If it is desired to have as small as possible an open area in the chimney lid, a spider having only one depending leg can be used. This leg, instead of being a flat plate-like element such as shown in the drawing, can be a rod-like stem that extends downwardly from the cap and supports horizontal extensions such as extensions 40 of the drawing.

Another function of the retaining spider can be to provide variations in the weights of the different caps. We do this by using spiders of different weights under the different caps. The purpose is to compensate for differences in pressure drop across different bubble caps. Thus, the liquid level is higher on the liquid inlet side of a bubble tray than on the outlet side. Consequently, if all of the vertically displaceable bubble caps across the tray are identical in weight the vapor can escape more easily on the outlet side of the tray where the liquid head is less. There will then be a tendency for vapor to flow through only one side of the tray and the tray will function inefficiently. To avoid this with our apparatus the spiders can be graded in weight with heavier weights being used on the outlet side of the tray so that each bubble cap will require the same vapor velocity to raise it. Similarly, the weights of the spiders on different trays can be varied if desired, since there is a variation in the pressure drop across the different trays from the bottom to the top of the tower.

Obviously many modifications and variations of the invention as hereinbefore set forth may be made without departing from the spirit and scope thereof and therefore only such limitations should be imposed as are indicated in the appended claims.

We claim:

1. Vapor-liquid contacting apparatus comprising a horizontal bubble tray having a plurality of openings forming vapor passages therethrough, a generally tubular chimney surrounding each of said openings and extending upwardly from said tray, said chimney being provided with narrow vertical slots substantially equally spaced apart throughout its circumference, a vertically displaceable bell-shaped cap surmounting each of said chimneys, the lower rim of said cap being adapted to rest on the floor of said tray about said chimney to form a seal against the flow of liquid from said tray into said chimney, a retaining spider attached to the under surface of the top of said cap and extending downwardly through said chimney and the opening in said tray, said spider being adapted to limit the vertical and horizontal displacement of said cap and to give the cap a low center of gravity and stabilize said cap against tilting, said spider having a horizontal extension spaced apart a short distance below the under surface of said tray, said horizontal extension serving as a means for limiting the vertical displacement of said cap and said vapor passages being open for vapor flow through said tray when said caps and associated limiting means are lifted to any level of vertical displacement.

2. Vapor-liquid contacting apparatus comprising a horizontal bubble tray having a plurality of openings forming vapor passages therethrough, a generally tubular chimney surrounding each of said openings and extending upwardly from said tray, said chimney being provided with narrow vertical slots substantially equally spaced apart about its circumference, a vertically displaceable bell-shaped cap surmounting said chimney, the lower rim of said cap being adapted to rest on the floor of said tray surrounding said chimney to form a seal against the flow of liquid from said tray into said chimney, a retaining spider adapted to limit the vertical and horizontal displacement of said cap and to give the cap a low center of gravity and stabilize said cap against tilting, said spider having a plurality of elongated flat legs attached at the upper ends thereof to the under surface of said cap, said legs extending downwardly through said chimney and below said tray, said legs being substantially equally spaced apart radially and extending radially from the center of said chimney to points near the inner surface of said chimney, said legs having horizontal extensions at the lower ends thereof, said horizontal extensions being spaced a substantial distance below said tray when the rim of said cap rests on said tray floor, said horizontal extensions extending under said tray to points beyond the circumference of said chimney, the legs of said spider serving as means to limit horizontal displacement of said cap and the horizontal extensions of said spider serving as means to limit the vertical displacement of the cap and said vapor passages being open for vapor flow through said tray when said caps and associated limiting means are lifted to any level of vertical displacement.

3. Vapor-liquid contacting apparatus comprising a horizontal bubble tray having a plurality of openings forming vapor passages therethrough, a generally tubular slotted chimney surrounding each of said openings and extending upwardly from said tray, the slots of said chimney being substantially equally spaced apart throughout the circumference of the chimney, a vertically displaceable bell shaped cap surmounting said chimney, the lower rim of said cap being adapted to rest on the floor of said tray about said chimney to form a seal against the flow of liquid from said tray into said chimney, the inner surface of the side wall of the cap being spaced apart a short distance from the outer surface of the chimney and thereby forming a generally annular space between the sides of the cap and cihmney, said annular space being substantially smaller in cross sectional area than the total slot area of the chinmney, a retaining spider attached to the under surface of the top of said cap and extending downwardly through said chimney and the opening in said tray, said spider being adapted to limit the vertical and horizontal displacement of said cap and to give the cap a low center of gravity and stabilize said cap against tilting, said spider having a horizontal extension spaced apart a short distance below the under surface of said tray, said horizontal extension serving as a means for limiting the vertical displacement of said cap and said vapor passages being open for vapor flow through said tray when said caps and associated limiting means are lifted to any level of vertical displacement.

4. Apparatus according to claim 3 in which the top of the chimney is at least partially enclosed to insure passage of vapor through the slots of the chimney.

5. Apparatus according to claim 3 in which said vertically displaceable bell-shaped cap has outwardly flaring side walls.

References Cited in the file of this patent

UNITED STATES PATENTS

| | | |
|---|---|---|
| 1,057,576 | Mussell | Apr. 1, 1913 |
| 1,453,735 | Twining | Jan. 20, 1922 |
| 1,808,276 | Widdell | June 2, 1931 |
| 2,175,360 | Peff | Oct. 10, 1939 |
| 2,428,889 | Nutter | Oct. 14, 1947 |
| 2,525,064 | Bragg | Oct. 10, 1950 |
| 2,658,737 | Nutter | Nov. 10, 1953 |
| 2,772,080 | Huggins et al. | Mar. 8, 1954 |
| 2,871,003 | Galbreath | Jan. 27, 1959 |

FOREIGN PATENTS

| | | |
|---|---|---|
| 92,960 | Austria | June 11, 1923 |